J. S. HAYDEN.
OPERATING MECHANISM FOR STUMP PULLERS.
APPLICATION FILED DEC. 30, 1914.
1,169,032.
Patented Jan. 18, 1916.
2 SHEETS—SHEET 1.
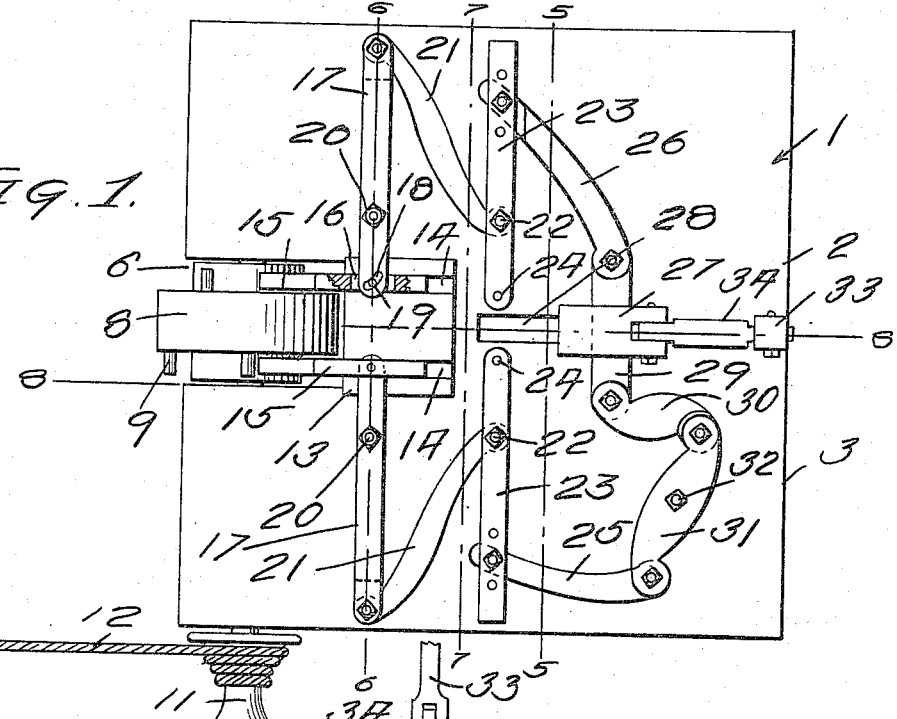
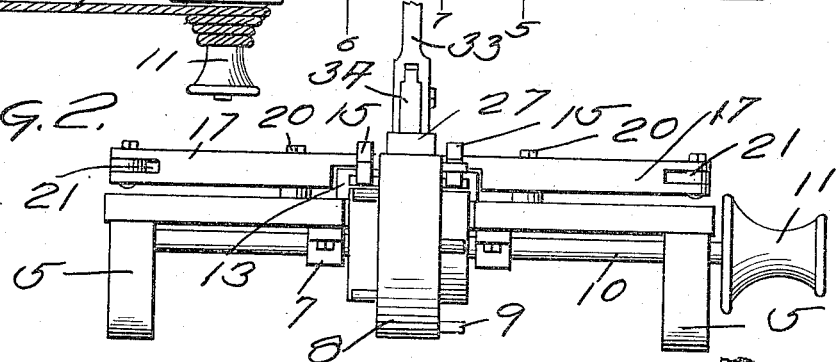
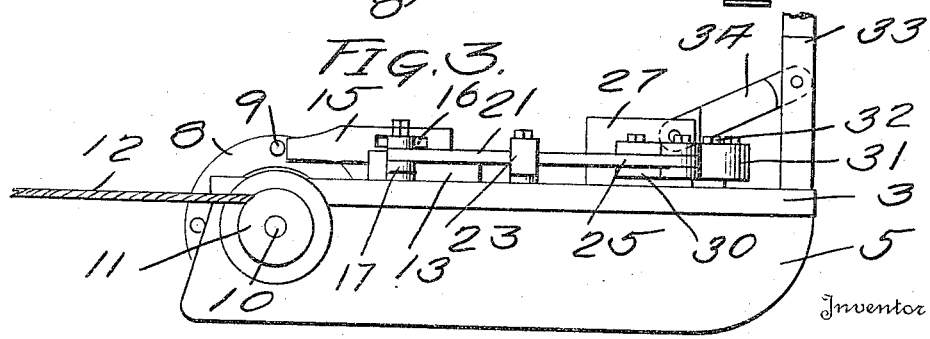
Witnesses
Inventor
J. S. Hayden
By
Attorneys J. S. HAYDEN.
OPERATING MECHANISM FOR STUMP PULLERS.
APPLICATION FILED DEC. 30, 1914.
1,169,032.
Patented Jan. 18, 1916.
2 SHEETS—SHEET 2.
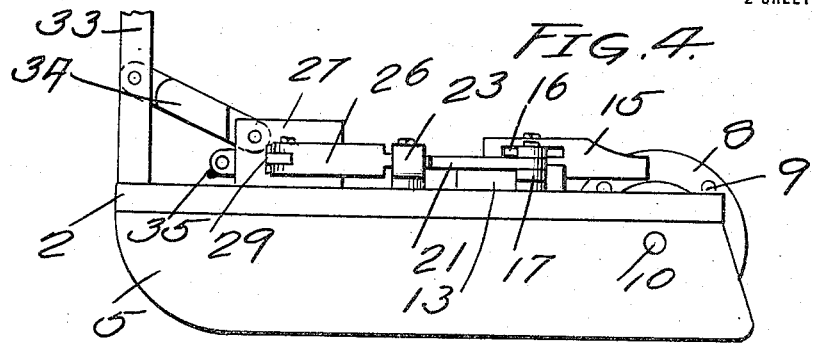
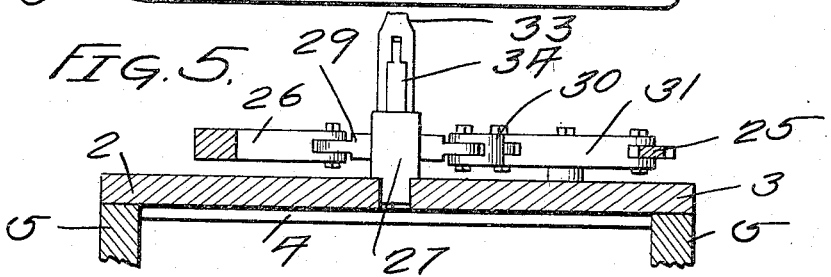
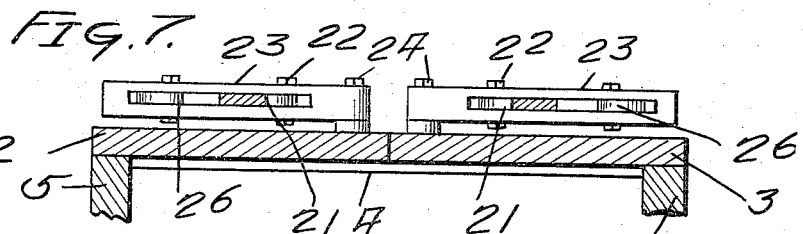
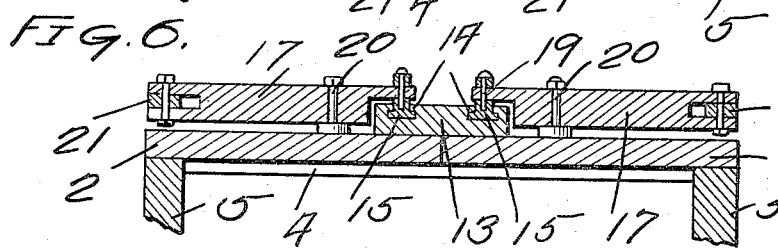
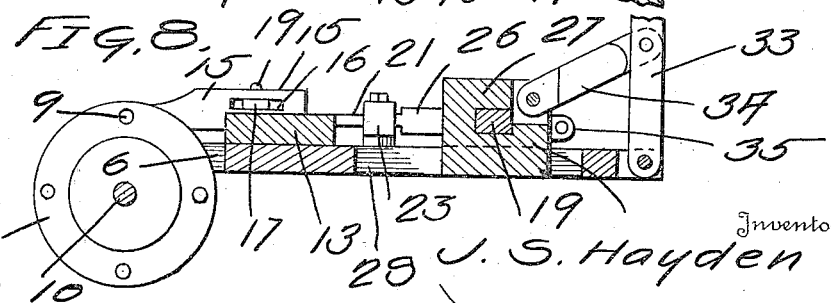
Witnesses
Inventor
J. S. Hayden
By
Attorneys

UNITED STATES PATENT OFFICE.

JOHN S. HAYDEN, OF PLANTATION, CALIFORNIA.

OPERATING MECHANISM FOR STUMP-PULLERS.

1,169,032.

Specification of Letters Patent.

Patented Jan. 18, 1916.

Application filed December 30, 1914. Serial No. 879,715.

*To all whom it may concern:*

Be it known that I, JOHN S. HAYDEN, a citizen of the United States, residing at Plantation, in the county of Sonoma, State of California, have invented certain new and useful Improvements in Operating Mechanism for Stump-Pullers; and I do hereby declare the following to be a full, clear, and exact description of the invention, such as will enable others skilled in the art to which it appertains to make and use the same.

This invention relates to a stump puller.

An object of the invention resides in the provision of a device by means of which a stump may be readily extracted from the ground, but I do not contemplate using the device merely for the pulling of stumps, but in many other connections where it is necessary to develop great power.

A further object of the invention resides in so constructing the device that a continuous motion is developed therein.

With these and other objects in view, such as will appear as the description progresses, my invention comprises the combination and arrangement of parts as set forth in and falling within the scope of the appended claims.

Referring to the drawing: Figure 1 is a plan view of my device, showing the levers of both sides of the base plate in such position that the pushing shoes will be disengaged from the projections on the fly wheel. Fig. 2 is a front elevation of the device. Fig. 3 is a side elevation looking from one side of the device. Fig. 4 is a similar view looking from the opposite side. Fig. 5 is a section on line 5—5 of Fig. 1, showing the connection of the operating levers to the sliding block. Fig. 6 is a section on line 6—6 of Fig. 1, showing the connection of the levers to the pushing shoes. Fig. 7 is a section on line 7—7 of Fig. 1. Fig. 8 is a section on line 8—8 of Fig. 1, showing the fly wheel in elevation.

Referring to the drawing wherein like parts are indicated by like characters throughout the several views:—My device comprises a base plate 1 made of two sections 2 and 3 suitably secured together on their under faces by brace strips 4. This base plate is mounted on runners 5 and has in one end thereof a slot 6 extending inwardly from the edge.

Rotatably mounted in bearings 7 on the under face of the base plate 1 and extending upwardly through the slot 6 is a fly wheel 8 which has on each face thereof a plurality of pins 9. A shaft 10 on which the said wheel 8 is secured extends outwardly beyond one side of the base plate 1 and has a winding drum 11 of suitable construction thereon, on which drum a cable 12 or other suitable member is wound, which cable may be attached to a stump and upon the drum 11 being rotated will lift the stump from the ground.

In order that the fly wheel 8 may have continuous rotary movement, I have provided a block 13 which is dove-tailed into the base plate 1 immediately to the rear of the fly wheel 8 and has two longitudinally extending slots 14 in the upper face thereof in which shoes 15 are slidably mounted, which shoes extend to the opposite sides of the fly wheel 8 and the ends of which are arranged to engage the pins 9 thereon. In order that these shoes 15 may be intermittently and alternately pushed forwardly to engage the pins 9, I have provided said shoes with slots 16 into which the ends of the levers 17 extend, which levers have arcuate slots 18 therein through which slots pins 19 extend, the said pins being mounted in the shoes 15. These levers 17 are pivoted, as at 20, between their ends on the base plate 1 and have pivotally secured to the ends thereof links 21 which are in turn pivoted at intermediate points 22 to additional levers 23, the said levers being pivoted to the base plate 1, as at 24, and having links 25 and 26 pivoted thereto. It will be realized that should these links 25 and 26 be connected directly to an operating lever they would be moved forwardly and rearwardly together and consequently both of the shoes 15 would move forwardly and rearwardly at the same time.

Now in order that the wheel 8 may be actuated upon the forward and rearward movement of the operating block 27 which is slidably mounted in a slot 28, I have extended an arm 29 through this block 27 and connected the link 26 directly and pivotally to one end thereof but have pivoted to the other end of the block a link 30 which is in turn pivoted to one end of a lever 31, which lever is pivoted between its ends, as at 32, and at its other end to the link 25. In order that the operating block 27 may be moved forwardly and rearwardly, manually, I have pivoted to the base plate 1 an operating lever 33 which is connected to the operating block 27 by a pivoted link 34. However, this operating lever 33 may be omitted and the power applied to the operating block 27 through a connecting member 35 which is mounted on the block 27 and is adapted to be connected suitably to an engine or other source of power.

In operation as the operating lever 33 is pushed forwardly the block 27 is likewise pushed forwardly and through the connecting link 26, the adjacent levers 17 and 23 and the link 21 adjacent the shoe 15 is moved rearwardly, while the shoe 15 on the opposite side of the fly wheel 8 is moved forwardly and through its engagement with one of the pins 9 imparts an impulse to the said fly wheel and causes the same to rotate. As the operating lever 33 is moved rearwardly the operation of the shoes 15 reverses and another impulse is applied to the fly wheel.

From the foregoing description it will be seen that I have provided a device by means of which a stump may be readily pulled, which device may be either manually or automatically operated, and I have so constructed the device that it is adapted for use in many other connections where great power is needed.

While I have illustrated and described a particular embodiment of my invention, I have merely done so for the sake of convenience and I do not wish to be limited to that particular embodiment as it is obvious that numerous changes may be made in the details of construction thereof without departing from the spirit of the invention or exceeding the scope of the appended claims.

What I claim is:—

1. In a device of the class described, a base plate, a fly wheel mounted on one end thereof and having outwardly extending pins on the sides thereof, shoes slidably mounted on the plate and arranged on the opposite sides of said fly wheel to engage the pins thereon, and means to alternately cause the shoes to engage the said pins.

2. In a device of the class described, a base plate, a fly wheel mounted on a horizontal shaft on one end thereof and having pins on its opposite faces, shoes slidably mounted on the base plate arranged to engage said pins, means to alternately cause said shoes to engage the said pins including levers pivoted to said shoes and to the base plate, additional levers pivoted to the base plate at certain of their ends, links connecting said levers, the said links being connected to certain of the ends of the said first mentioned levers and between the ends of the last mentioned levers, an operating block, means connecting the operating block and one of the last mentioned levers in such manner that as the block moves forwardly the adjacent shoe will be moved forwardly, and means connecting the other of said last mentioned levers to the said block so that upon the forward movement of the block the other of the said shoes will be moved rearwardly.

3. In a device of the class described, a base plate, a fly wheel rotatably mounted thereon and having pins on the opposite faces thereof, shoes slidably mounted on the base plate, an operating lever pivotally mounted on the base plate, means connecting said shoes whereby when the operating lever is moved forwardly one of said shoes will be moved forwardly and the other simultaneously rearwardly.

In testimony whereof, I affix my signature, in the presence of two witnesses.

JOHN S. HAYDEN.

Witnesses:
F. D. TROSPER,
E. E. TROSPER.

Copies of this patent may be obtained for five cents each, by addressing the "Commissioner of Patents, Washington, D. C."